(12) United States Patent
Howarth

(10) Patent No.: US 11,506,123 B2
(45) Date of Patent: Nov. 22, 2022

(54) AIR INTAKE COVER

(71) Applicant: MBDA UK LIMITED, Stevenage (GB)

(72) Inventor: Anthony James Howarth, Stevenage (GB)

(73) Assignee: MBDA UK Limited, Stevenage (GB)

( * ) Notice: Subject to any disclaimer, the term of this patent is extended or adjusted under 35 U.S.C. 154(b) by 310 days.

(21) Appl. No.: 16/619,112

(22) PCT Filed: Jun. 4, 2018

(86) PCT No.: PCT/GB2018/051518
§ 371 (c)(1),
(2) Date: Dec. 4, 2019

(87) PCT Pub. No.: WO2018/224809
PCT Pub. Date: Dec. 13, 2018

(65) Prior Publication Data
US 2020/0141318 A1    May 7, 2020

(30) Foreign Application Priority Data

Jun. 6, 2017  (EP) ..................................... 17275080
Jun. 6, 2017  (GB) ..................................... 1708985

(51) Int. Cl.
| | | |
|---|---|---|
| *F02C 7/055* | (2006.01) | |
| *B64D 7/08* | (2006.01) | |
| *F02K 9/78* | (2006.01) | |
| *F02C 7/05* | (2006.01) | |

(52) U.S. Cl.
CPC .............. *F02C 7/055* (2013.01); *B64D 7/08* (2013.01); *F02C 7/05* (2013.01); *F02K 9/78* (2013.01)

(58) Field of Classification Search
CPC ... F02C 7/05; F02C 7/055; B64D 7/08; F02K 9/78
See application file for complete search history.

(56) References Cited

U.S. PATENT DOCUMENTS

| | | | | |
|---|---|---|---|---|
| 4,257,567 | A | * 3/1981 | Hasquenoph | ............ B64D 1/02 89/1.53 |
| 4,874,145 | A | 10/1989 | Prentice | |
| 5,172,873 | A | * 12/1992 | Lum | ........................ B64D 7/08 294/82.26 |
| 5,660,357 | A | 8/1997 | Grossman et al. | |

(Continued)

FOREIGN PATENT DOCUMENTS

WO    WO 2016/070930 A1    5/2016

OTHER PUBLICATIONS

International Preliminary Report on Patentability dated Dec. 10, 2019, together with the Written Opinion received in related International Application No. PCT/GB2018/051518.

(Continued)

*Primary Examiner* — Steven M Sutherland
(74) *Attorney, Agent, or Firm* — Scully, Scott, Murphy & Presser, PC

(57) ABSTRACT

A cover for an intake of an air-breathing engine in a missile is disclosed. The cover comprises a closure for closing the inlet so as to prevent ingress of debris; and a fastening attachable to an aircraft-mounted launcher and configured such that the cover remains attached to the aircraft on launch of the missile.

11 Claims, 3 Drawing Sheets

(56) References Cited

U.S. PATENT DOCUMENTS

2009/0252604 A1\* 10/2009 Alexander .............. F01D 25/18
　　　　　　　　　　　　　　　　　　　　　　　　415/180
2014/0008497 A1　 1/2014 Alexander et al.
2018/0179990 A1\* 6/2018 Garcia .................... B64G 1/40

OTHER PUBLICATIONS

International Search Report and Written Opinion dated Aug. 9, 2018 issued in PCT/GB2018/051518.
Extended European Search Report dated Dec. 12, 2017 issued in EP 17275080.4.
Great Britain Search Report dated Dec. 5, 2017 issued in GB 1708985.5.

\* cited by examiner

AIR INTAKE COVER

FIELD OF THE INVENTION

This invention relates to an air intake cover, and particularly to an air intake cover for the intake of a missile air-breathing engine.

BACKGROUND ART

Missiles for launch from aircraft typically spend some time in storage and transit prior to being loaded onto an aircraft-mounted launcher, following which they will spend some time in air carriage on the aircraft prior to a possible launch. Subsequent to launch, the missile is propelled by its own engine, which may for example be either a rocket-type engine, or an air breathing engine. In the latter case, the missile will be provided with one or more air intakes. It is known to provide air intake covers to prevent ingress of environmental debris prior to launch of the missile, so as to ensure that the engine is able to operate properly upon launch.

Prior known air intake covers are ejected from the missile after it is launched from the aircraft, depending on a specific and independent actuation mechanism for removal of the cover. For example, the cover may be ejected from the air intake at some point shortly after launch of the missile. Typically ejection of the cover is achieved through use of an actuator located either within the missile, operating to push the cover out, or on the cover itself. After actuation, the airflow past the missile in flight will act to propel the cover away from the missile. Such mechanisms carry inherent risks, such as the risk of collision of the ejected cover with either the launching aircraft or the missile, or icing around the cover preventing its ejection. The risk of collision with the missile itself can be mitigated by aerodynamic modelling of the ejection process and suitable adaptation of the cover, but this can be a complex and costly process.

In addition to these risks, the potential failure of the cover ejection mechanism, for example because of failure of the actuation mechanism itself, must be considered. Failure of the cover to eject properly may result in the missile engine failing to operate, and hence the failure of the missile's intended operation. Because of the nature of missile use, it is likely that they may be stored for up to twenty or twenty five years prior to an actual launch, enhancing the risks of actuator failure as a result of corrosion or wear resulting from movement or vibration in storage. Maintenance is therefore necessary in order to ensure that actuators function as intended on launch.

SUMMARY OF THE INVENTION

In general terms, the present invention resides in the realisation that the launch mechanism itself can be used to remove the cover from the air intake. Accordingly a first aspect of the invention provides a cover for an intake of an air-breathing engine in a missile, which missile can be carried by an aircraft-mounted launcher; wherein the cover is transformable from a first configuration, in which it fits on the missile to cover the intake, to a second configuration, in which the cover is detachable from the missile; and wherein transformation from the first configuration to the second configuration results from launch of the missile. In this arrangement, the launch mechanism itself results in the removal of cover from the air intake. No additional actuation mechanism is required to separate the cover from the missile. This reduces the risk of launch failure because of the reduction in the number of actuation mechanisms required for launch of the missile.

The transformation from the first state to the second state may result from launch of the missile by an ejection release unit. Embodiments of the invention are particularly suited to launchers having ejection release units, which typically push the missile downwards relative to the aircraft with a substantial force. The force generated by the ejection release unit can be used to push the missile out of the cover.

The cover may be configured to be attachable to the launcher such that, on launch of the missile, the cover detaches from the missile and remains attached to the launcher. Where the cover remains attached to the aircraft following launch of the missile, the risk of collision of an ejected cover with either the aircraft or the missile is mitigated. Moreover this is achieved without the need for complex aerodynamic simulation work.

The cover may be further configured such that, when in place on the missile, the closure is biased against the inlet. This helps to ensure that the intake remains closed, and also creates a mechanical attachment of the cover to the missile, since the cover will grip the missile. The cover may further comprise a sealing ring arranged such that, when the cover is in place on the missile, the sealing ring is located around the intake so as to seal the intake from the external environment. The provision of a seal ensures that moisture cannot enter into the air intake.

The cover may be deformable from the first configuration to the second configuration. For example, where an ejection release unit is used to launch the missile, the force generated by the ejection release unit pushes the missile away from the launcher and also acts to deform the cover so that the missile is released from it. The cover can be made sufficiently compliant so as to deform during ejection in order to release the missile, without hindering that ejection.

The cover may be fabricated from a resilient material. It will be appreciated that the deformation of the material on ejection may be either elastic or plastic depending on the material selected for fabrication of the cover.

The cover may be fabricated from a plastics material. Plastics materials are resistant to corrosion, and can be moulded to the appropriate form. The cover may be fabricated form a glass-filled polyphenylene sulphide, for example a 40% glass-filled polyphenylene sulphide. These materials are resistant to creep, which may occur in conditions where the cover is to be stored in a slightly deformed shape on a missile for some time. Creep during storage may reduce the effectiveness of the seal through a reduction in the compressive force acting on the sealing ring.

The cover may be attachable to the launcher via a compliant fastening arranged to accommodate movement of the missile relative to the launcher during air carriage. This mitigates against the fastening between the cover and the launcher becoming a load path for restraint of the missile to the launcher, and hence reduces the possibility of vibration or bending movements of the missile in transit loosening the cover on the missile.

The fastening may be a quick-release fastener. These are simple and quick to operate, so that the attachment of the cover to the aircraft mounted launcher is not a time-consuming task.

The cover may comprise inwardly protruding elements shaped to fit into corresponding rebates in the missile body tube and configured so as not to impede launch of the missile. Such elements assist in locating the cover on the correct part of the missile so that the cover is properly attached to the missile and so that the air intakes are effectively closed.

The cover may be configured to withstand aerodynamic loading during flight and whilst attached to the launcher, both before and after launch of the missile. The cover may be fabricated from a material sufficiently strong and stiff to withstand aerodynamic loading. The cover may be sufficiently thick to withstand the aerodynamic loading.

The cover may be generally cylindrical in shape, having a central portion from which two sides extend downwards. In a first, closed configuration, the two sides may extend around the missile body tube and may be biased or pushed against the missile body tube so as to close the air intakes of the missile. The cover may be configured to be attachable to an aircraft so that, when the missile is launched, the force applied to the missile is sufficient to transform the cover to a second, open configuration, so as to allow the missile to escape the cover, thereby opening the air intakes of the missile. The cover may be attachable to an aircraft at its central portion. The two sides of the cover may extend around the missile body tube to a distance below the centre line of the missile body tube. The cover may be deformable and resilient. The cover may be configured such that, when the missile is launched, the cover deforms from the first, closed configuration, to the second, open configuration.

The invention extends to a missile having an air-breathing engine and comprising a cover as described above covering the intakes for the air-breathing engine.

BRIEF DESCRIPTION OF THE DRAWINGS

Embodiments of the invention will now be described by way of example only and with reference to the accompanying drawings, of which.

DETAILED DESCRIPTION

Missiles having air-breathing engines, such as jet engines, require one or more air intakes in order for the engine to function. Ingress of environmental debris into the air intakes prior to launch of the missile can reduce the effectiveness of the missile engine or prevent it from operating. Such ingress can occur during storage or transit of the missile, despite it being contained in a munitions box, as well as during air carriage of the missile. As a result air intake covers are used to prevent such ingress of environmental debris, and, prior to ignition of the engines, it is necessary for the covers to be removed from the air intakes.

Figure 1:
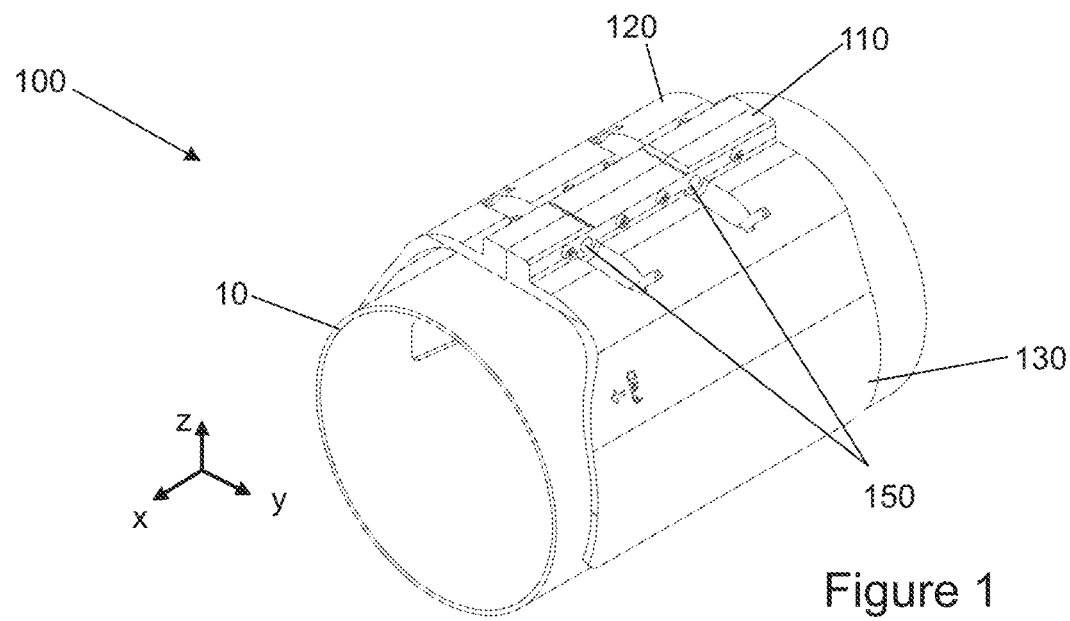
FIG. 1 is a schematic diagram of an air intake cover in position on a missile body tube.
Figure 2:
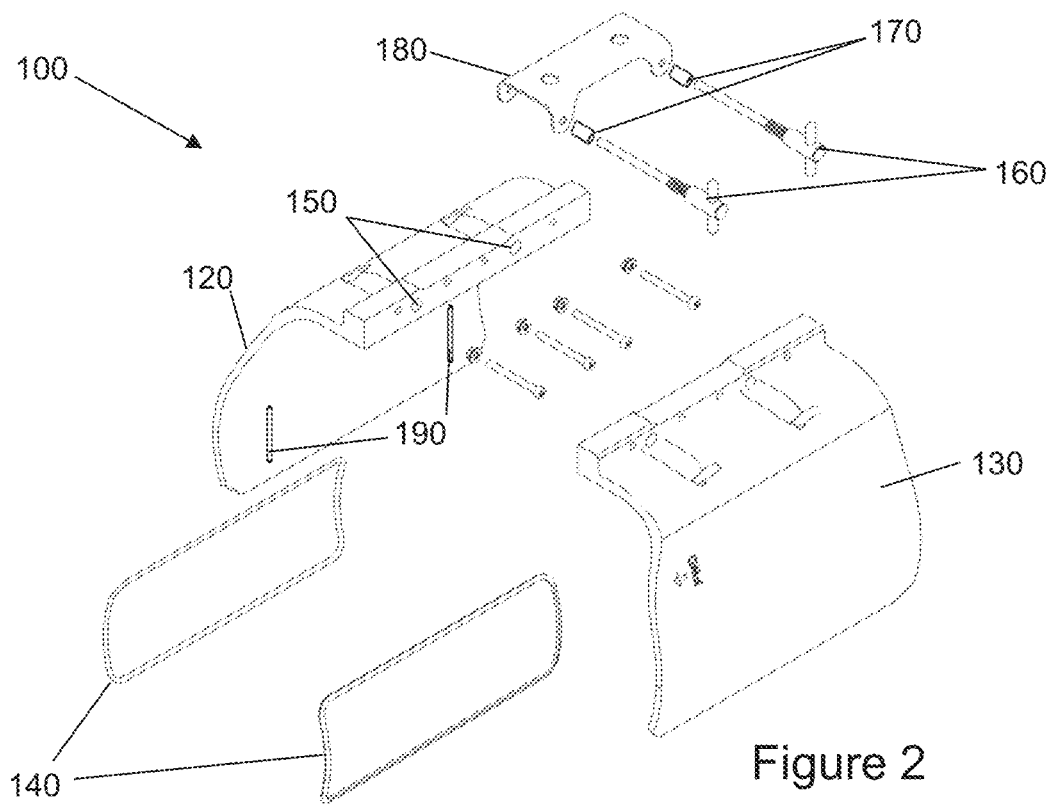
FIG. 2 is an exploded schematic diagram showing the component parts of the air intake cover of FIG. 1 in further detail.
Figure 3:
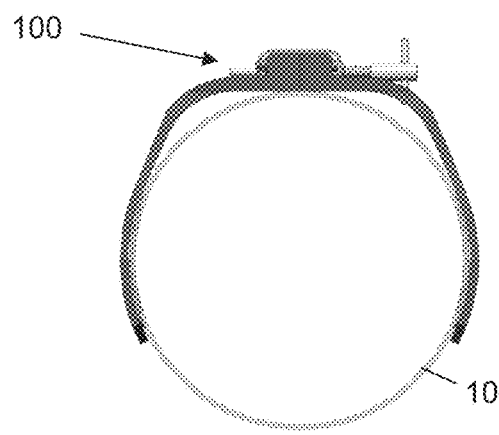
FIG. 3 is a cross-sectional schematic diagram of the air intake cover of FIG. 1.

An air intake cover 100 in accordance with a first embodiment of the invention is illustrated in FIGS. 1, 2 and 3. FIG. 1 shows the cover in use to cover the air intake of a missile 10, only part of which is shown, whilst FIG. 2 shows the components of the cover 100 in exploded form, and FIG. 3 shows the cover in cross section in place on a missile 10. Like reference numerals are used to refer to like parts in these Figures. In its closed configuration as shown in FIG. 1, the cover 100 fits over the air intakes so as to seal them against any debris entering into the intakes. In general terms, cover 100 functions in a similar way to a 'c-clip', having (as is shown more clearly in FIG. 3) a c-shaped cross-section, and being deformable such that the open part of the 'c' can expand, under an appropriately directed force, to widen the opening, transforming the cover into an open configuration so as to enable the missile 10 to be pushed out of the cover 100. Removal of the cover 100 from the air intakes is accomplished as an integral part of the launch of the missile 10. By way of example, cover 100 can be used in combination with a launcher having an ejection release unit.

Figure 4A:
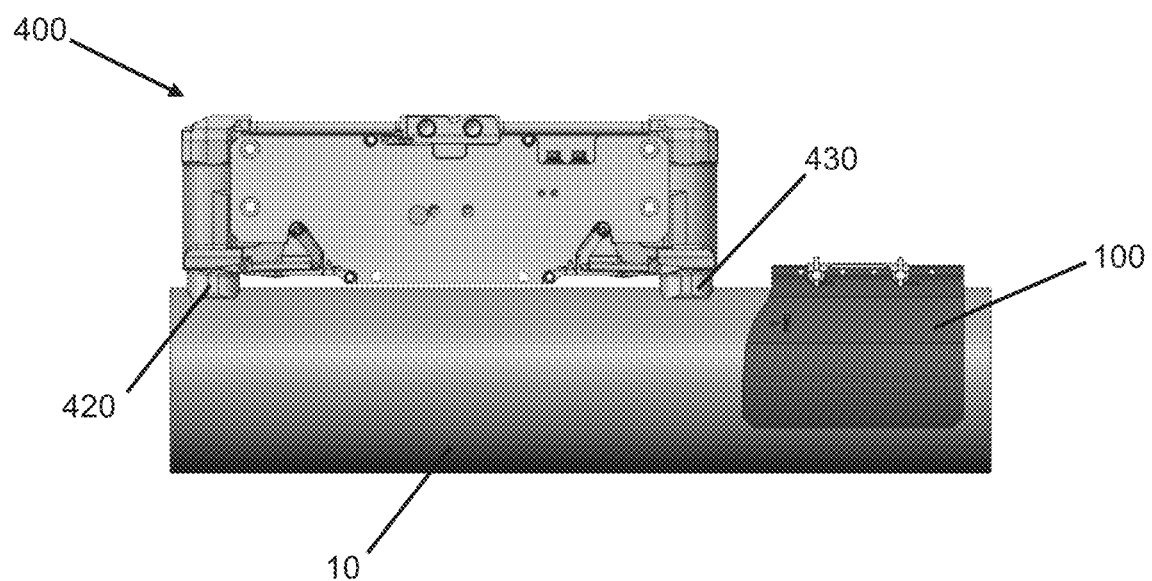
FIG. 4a is a schematic diagram showing the air intake cover of FIG. 1 on a missile attached to a launcher on an aircraft.
Figure 4B:
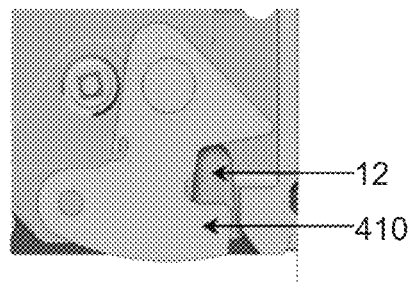
FIGS. 4b and 4c illustrate component parts of the missile and launcher of FIG. 4a in further detail.
Figure 4C:
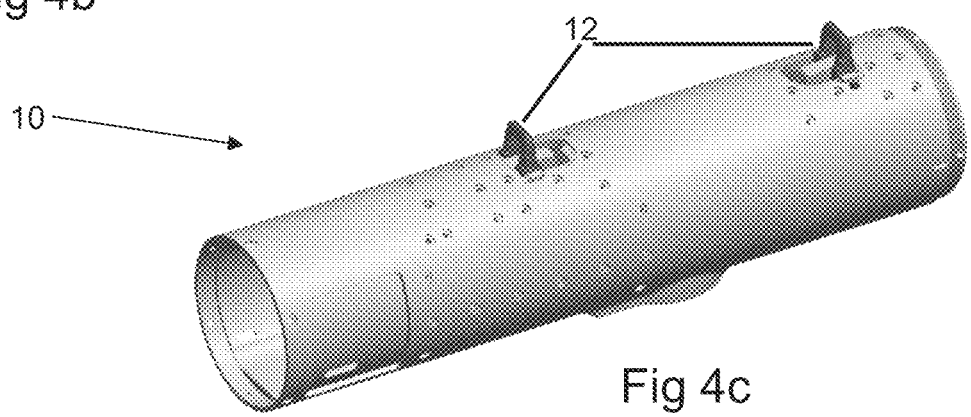

In air carriage, as shown in FIG. 4a, the missile 10 may be held in place by retractable hooks 410 (see detail in FIG. 4b) on ejection release unit 400 that cooperate with bale lugs 12 on the missile (see FIGS. 4b and 4c). The bale lugs are positioned with the air intake between them so that operation of the ejection release unit 400 does not create a pitching moment due to the resilience of the cover 100. On launch, the hooks 410 retract, and two pistons, comprised within the ejection release unit at 420, 430, operate to push the missile 10 away from the aircraft (in the minus z direction, using the coordinate system as illustrated in FIG. 1). Typically the force applied by the pistons 420, 430 will be of order 25 kN, since it is necessary to ensure that the missile is removed rapidly from the boundary airspace around the launching aircraft. In alternative embodiments, it will be possible to compensate for any pitching moment where the air intake is not between the bale lugs by tuning of the force applied by the pistons 420, 430 of the ejection release unit.

As illustrated in FIG. 1, cover 100 fits around a portion of a missile body tube 10. The portion of the body tube 10 comprises two air intakes, in the present example symmetrically disposed on either side of the missile body tube. Cover 100 is cylindrical in shape, but having a part of one side cut away so as to have a 'c' shaped cross-section, as described above. As shown, the cover 100 has an upper central portion 110 from which sides 120, 130 extend downwards and around the missile body tube 10 to a distance below the centre line of the missile body tube. Sides 120, 130 are positioned on the missile so as to close the air intakes of the missile. Closure of the air intakes mitigates the risk of ingress of environmental debris into the air intakes.

Cover 100 is deformable and resilient. In its undeformed state, the maximum width between the two sides of the cover 120, 130 is slightly less than the diameter of the missile body tube at the point which the cover is to be attached. The cover 100 is formed from a resilient material, so that, when on a missile, the sides 120, 130 are biased into the side of the missile body tube. This assists in ensuring that the air intakes are closed. In the present embodiment, a sealing ring 140 (shown in FIG. 2) is additionally provided on the internal face of each of the sides 120, 130 of the cover 100, positioned on these faces so as to form a closed loop around each of the air intakes. The resilience of the cover therefore acts to press the sealing ring between the cover sides 120, 130 and the missile body tube 10, when the cover is in position on the tube. A seal is thereby created around the air intake to prevent ingress of environmental debris into the air intake.

The degree of deformation of the cover, and its compliance, are selected so that the compressive force exerted on the sealing ring creates an effective seal, and so that the cover is held in place on the missile body tube. These requirements balance with the need to ensure that the cover deforms on actuation of the ejection release unit without impeding the release of the missile. The design of the cover balances these two requirements. However, it will be appreciated that an appropriate balance can be easily achieved because the loads generated during ejection are high compared to those required to create an effective seal, and to hold the cover in place during air carriage whilst subject to vibration and possible aerodynamic loading.

The cover is attached to the launcher via its upper central portion 110. The cover has a ridge structure at its upper central portion through which a number of apertures 150 for fasteners are formed. Quick release fasteners 160 pass through deformable bushes 170 within these apertures. The fasteners 160 and are used to enable the cover to be attached to an interface 180 provided on the launcher at the time the missile is to be loaded onto an aircraft in preparation for deployment. The bushes are formed of a suitably compliant rubber material, such as nitrile rubber, and allow some movement of the missile and cover relative to the launcher. The compliance of the deformable bushes is such that the bushes do not become a load restraint path for missile restraint to the launcher. This mitigates the risk of the cover being dislodged as a result of movement of the missile during air carriage. Such movement may arise from missile bending modes, possible since the missile is attached at only two points to the launcher, vibration or aerodynamic loading during air carriage. The level of compliance, in the present embodiment, is of the order of a few millimetres.

The cover 100 can be attached to the missile at the time of manufacture of the missile. Cover 100 is made in two pieces that are fitted in place on the missile body tube so as to join at the upper ridge structure, where the two pieces are bolted together so that the cover is positioned on the missile body tube covering the air intakes. Alternatively, the cover can be a single-piece construction, fabricated to as to be resilient and to be elastically deformable so that it can be pushed to fit onto the missile body tube, with appropriate tooling. Dowels 190 can be provided on the sides 120, 130 of the cover, facing into the missile, so as to fit into corresponding rebates on the missile (not shown in the Figures), enabling the cover to be easily positioned at the correct point on the axis missile body tube in order to ensure the air intakes are sealed. The dowels are oriented perpendicularly to the main axis of the missile (vertically, as shown in the Figures) so as not to impede the launch of the missile. The missile can then be transported and stored as appropriate prior to loading onto an aircraft for deployment. It will be noted that the time spent in storage could be several years, possibly up to around twenty or twenty five years.

As described above, the cover, when in situ on a missile, is deformed out of its relaxed state such that the sealing ring is pressed down onto the surface of the missile body tube. Since the missile may be in storage for some years prior to deployment it is therefore important that the material from which the cover is fabricated is resistant to creep over such time periods in order to maintain the seal. One exemplary material from which the cover can be made is 40% glass-filled polyphenylene sulphide (PPS), a resilient material which can be injection-moulded to the required shape.

Loading to the missile onto an aircraft is achieved in the same manner as is currently used, with the exception of the quick-release fasteners on the upper ridge structure 110 of the cover 100, which are used to attach the cover to the launcher on the aircraft. It may be necessary for a separate mechanical interface component to be attached to the launcher prior to loading the missile so that the cover can be attached to the launcher. In the present embodiment, interface 180, shown in FIG. 2, is provided for attachment to the launcher. The interface can be permanently attached to the launcher and as a result can be provided with the cover but may already be present on the launcher. Interface 180, once attached to the launcher, provides holes through which the quick release fasteners 160 can pass so as to attach the cover 100 to the launcher. During air carriage the cover remains attached to the missile and the aircraft, with the possibility of some movement enabled by the deformable bushes through which the quick-release fasteners pass, as described above.

Launch of the missile is accomplished by activation of the ejection release unit 400, as has been described above. The force applied to the missile by the pistons of the ejection release unit is sufficient to deform the cover 100 so as to allow the missile to escape the cover, the cover remaining attached to the aircraft via the quick release fasteners. The deformation of the cover on launch may be either elastic, so that the cover returns to its unbiased configuration, or plastic. Where the deformation is elastic the cover may be re-usable. Because the cover deforms to release the missile, and remains attached to the aircraft, the risk of parts of the cover colliding with the missile during launch is mitigated.

The cover 100 is constructed so as to be strong enough to withstand any aerodynamic loading it may be subjected to subsequent to the missile being launched, whilst also being compliant enough to deform so as to release the missile without significantly impeding its launch. It is also constructed so as to be sufficiently stiff to ensure a sealing of the air intakes during air carriage, when there is a potential for airflow over the cover to result in an aerodynamic force lifting the cover away from the missile. These requirements can be met by selecting an appropriate geometry for the cover, in combination with a suitable material. For 40% glass filled PPS, a uniform thickness of approximately 10 mm is considered to be suitable for the cover.

Figure 5A:
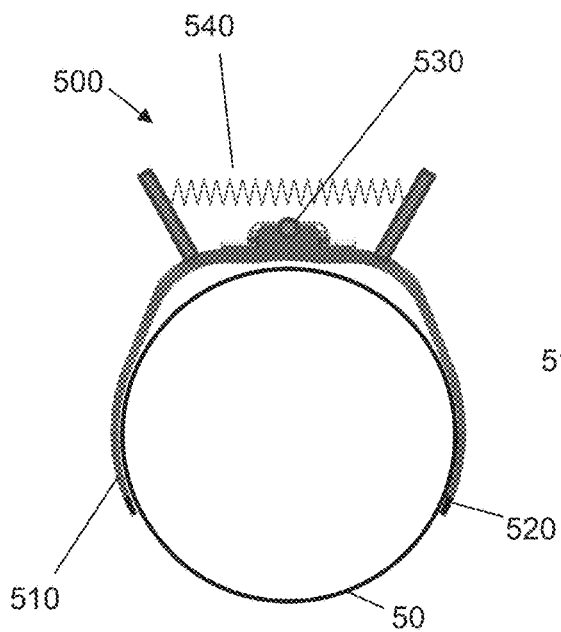
FIGS. 5a and 5b are schematic diagrams of a cover in accordance with a second embodiment of the invention.
Figure 5B:
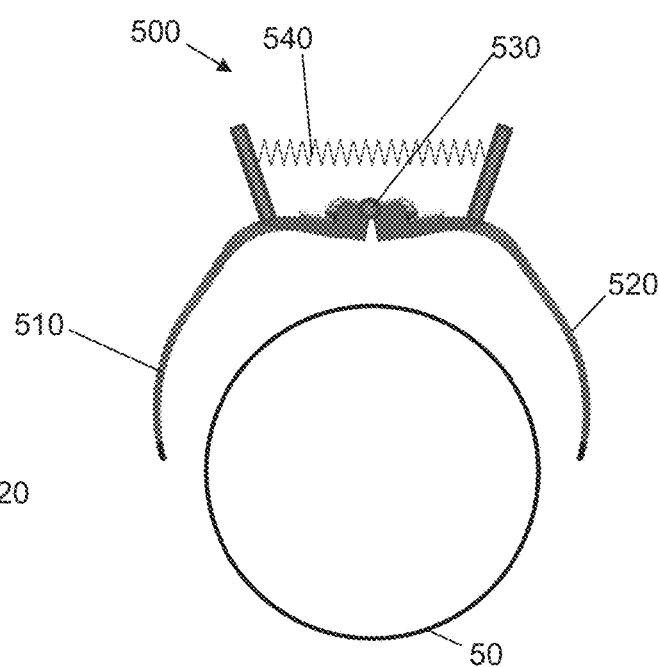

A cover 500 in accordance with a second embodiment of the invention is shown in FIGS. 5a and 5b. The second embodiment is similar to the first embodiment described above, and, as will be appreciated by those skilled in the art, similar design considerations apply to the second embodiment as to the first. As such only the differences between the first and second embodiments are described in detail, whilst other features will be apparent to the skilled person without further description. As with cover 100, cover 500 is formed of two complementary parts 510, 520 joined together in an upper central portion that can be attached to an aircraft-mounted launcher. In the case of cover 500, the two parts 510, 520 are formed of a more rigid material, and are joined together by a hinge 530. A spring 540 is provided so that the hinge 530 is biased towards the closed position shown in FIG. 5a, such that, when in place on a missile body tube 50, the sides of the cover 510, 520 are pushed against the missile body tube 50, thereby closing the air intakes of the missile and holding the cover in place. On actuation of an ejection release unit, hinge 530 is pushed to its open position as shown in FIG. 5b, so that the missile can be pushed out of the cover and away from the aircraft. Similarly to cover 100, the compliance of the spring is selected to hold the cover appropriately onto the missile whilst also avoiding any significant impediment to the ejection of the missile.

Whilst specific embodiments of the invention have been described in the above, it is to be noted that variations and modifications are possible without departing from the scope of the present invention which is defined in the accompanying claims. For example, it will be appreciated by those skilled in the art that the cover could be manufactured from a low-strength aluminium, or an alternative creep-resistant plastic such as polyetheretherketone (PEEK_ or polyester (PETP). Alternative configurations of the above-described embodiments are also possible. For example, rather than using a sprung hinge to push the sides of cover 500 together, as has been described above, a simple hinge can be used, with frangible straps holding the sides of the cover together beneath the missile bodytube. These straps can be configured to break apart under loads significantly less than those generated by the ejection release unit, thus allowing the missile to be released.

Finally, it will be appreciated that the description of example embodiments and their applications provided above is intended to demonstrate a number of principles for the design and operation of such embodiments, both explicit and implied. The specific examples of functionality and features described may be applied in any reasonably foreseeable selection or combination consistent with those design principles, and the scope of the present invention as claimed below is intended to include all such selections and combinations.

The invention claimed is:

1. A cover for an air intake of an air-breathing engine in a missile, which missile can be carried by an aircraft-mounted launcher; and a sealing ring arranged such that, when the cover is in place on the missile, the sealing ring is located around the intake so as to seal the intake from the external environment, the cover being shaped to fit around a portion of the missile body tube, and having a central portion and two sides extending therefrom; wherein the cover is configured such that, on launch of the missile by an ejection release unit, the force applied to the missile is sufficient to deform the cover from a first, closed configuration, in which it fits on the missile with the two sides biased against the missile so as to close the air intake, to a second, open configuration, in which the cover is detachable from the missile; and wherein the cover is configured to be attachable to the launcher such that, on launch of the missile, the cover detaches from the missile and remains attached to the launcher.

2. A cover as claimed in claim 1, wherein the cover is fabricated from a resilient material.

3. A cover as claimed in claim 2, wherein the cover is fabricated from a plastics material.

4. A cover as claimed in claim 3, wherein the cover is fabricated from glass-filled polyphenylene sulphide.

5. A cover as claimed in claimed in claim 4, wherein the cover is fabricated from 40% glass-filled polyphenylene sulphide.

6. A cover as claimed in claim 1, attachable to the launcher via a compliant fastening arranged to accommodate movement of the missile relative to the launcher during air carriage.

7. A cover as claimed in claim 1, further comprising a releasable fastener to attach the cover to the launcher.

8. A cover as claimed in claim 1 comprising inwardly protruding elements shaped to fit into corresponding rebates in the missile body tube and configured so as not to impede launch of the missile.

9. A cover as claimed in claim 1, configured to withstand aerodynamic loading during flight and whilst attached to the launcher, both before and after launch of the missile.

10. A cover as claimed in claim 9, wherein the cover is sufficiently thick to withstand the aerodynamic loading.

11. A missile having an air-breathing engine and a cover covering the air intakes for the air-breathing engine, which missile can be carried by an aircraft-mounted launcher; the cover being shaped to fit around a portion of the missile body tube, and having a central portion and two sides extending therefrom; wherein the cover is configured such that, on launch of the missile by an ejection release unit, the force applied to the missile is sufficient to deform the cover from a first, closed configuration, in which it fits on the missile with the two sides biased against the missile so as to close the air intake, to a second, open configuration, in which the cover is detachable from the missile; and wherein the cover is configured to be attachable to the launcher such that, on launch of the missile, the cover detaches from the missile and remains attached to the launcher.

\* \* \* \* \*